Patented July 12, 1938

2,123,375

UNITED STATES PATENT OFFICE 2,123,375

ANTHRAQUINONYL AMIDES OF AROMATIC DICARBOXYLIC ACIDS

Walter Mieg and Franz Wieners, Opladen, Germany, assignors to General Aniline Works, Inc., New York, N. Y., a corporation of Delaware No Drawing. Application June 5, 1936, Serial No. 83,808. In Germany June 7, 1935

21 Claims. (Cl. 260—60)

The present invention relates to new vat dyestuffs.

In accordance with this invention new vat dyestuffs are obtained which may be represented by the following formula:

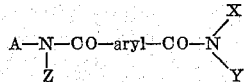

wherein A stands for a radical which is capable of being vatted,

X stands for an alkyl or aryl or a radical which is capable of being vatted and is different from that designated by A, Y stands for hydrogen or an alkyl group, or X and Y jointly stand for a pentamethylene chain, and Z stands for hydrogen or an alkyl group. In the above definition the term "alkyl" is intended to include cycloalkylamine as well as aralkylamine. Preferred radicals which are capable of being vatted are anthraquinone radicals though benzanthrone, anthanthrone, violanthrone or anthrapyrimidine radicals are not excluded. The aryl groups are preferably of the benzene or naphthalene series. Preferred substituents for $x$ are likewise anthraquinone radicals whereas $y$ in most cases stands for hydrogen or an alkyl group.

All these compounds are valuable vat dyestuffs. From the chemical point of view, they have in common that they are asymmetric amides of aromatic dicarboxylic acids. They are characterized by their good fastness properties and are particularly suitable for the printing of textiles.

These compounds can be prepared by causing a big excess of an aromatic dicarboxylic acid halide to react with the one amino compound at a lower temperature such as up to about 100° C., isolating the intermediate product thus formed and then causing the other amino compound to react thereupon at a higher temperature of, for instance, more than 100° C. The first stage process as well as the second stage process can be performed in the presence of a high-boiling solvent such as nitrobenzene, ortho-dichlorobenzene or trichlorobenzene.

Another method of working consists in effecting the first stage process in the presence of a compound capable of binding acids such as pyridine, dimethylaniline or quinoline. In this case the use of the excess dicarboxylic acid halide can be dispensed with.

The following examples illustrate the invention without, however, restricting it thereto the parts being by weight:—

Example 1

Into a solution of 12 parts of isophthaloyl-chloride and 30 parts of nitrobenzene there are gradually added at 70° C., 4 parts of finely powdered 1-aminoanthraquinone; the whole is then heated while stirring to 90° C., moisture being precluded. The reaction mixture is kept at this temperature until no 1-aminoanthraquinone is to be traced any longer. The temperature is then advantageously raised until dissolution has occurred. On cooling the condensation product of 1 mol. of isophthaloylchloride and 1 mol. of 1-aminoanthraquinone precipitates in form of yellow crystals which in order to remove the excess isophthaloylchloride may be rinsed with benzene.

For further transformation the compound thus obtained is introduced at 140° C. into a solution of 6.2 parts of 1-amino-5-benzoylaminoanthraquinone and 90 parts of nitrobenzene and stirred for 1 to 2 hours at 180° C. whereupon after cooling the precipitating crystals are isolated by filtration.

The condensation product thus obtained from isophthaloylchloride with 1-aminoanthraquinone and 1-amino-5-benzoylaminoanthraquinone represents a strong yellow vat dyestuff of good fastness properties which in the printing of textiles yields clear shades.

A similar dyestuff is obtained by the action of terephthaloylchloride with 1-aminoanthraquinone and 1-amino-5-benzoylaminoanthraquinone.

Example 2

8 parts of powdered 1-amino-5-benzoylaminoanthraquinone are gradually added while stirring at 100° C. to a solution of 40 parts of isophthaloylchloride and 60 parts of nitrobenzene. The reaction is kept at this temperature until the amino compound is no more to be traced. On cooling the precipitating orange-colored crystals are filtered off and freed from the excess isophthaloylchloride by means of nitrobenzene.

For further reaction the compound thus obtained is heated to 160–180° C. together with 8 parts of 1-amino-4-benzoylaminoanthraquinone and 170 parts of nitrobenzene until the amount of the reaction product is no longer increased.

The brownish-red crystals of the unsymmetrical acid amide thus obtained dissolve with a brownish-red shade in concentrated sulfuric acid and dye cotton from the vat orange shades of good fastness properties. They can also be employed for printing purposes.

When replacing in this example 1-amino-4-benzoylaminoanthraquinone by monoaminoanthanthrone a yellowish-brown vat dyestuff is obtained which is distinguished by its good fastness properties.

Example 3

Into 150 parts of nitrobenzene there are added 19.2 parts of finely powdered 1-amino-5-benzoylaminoanthraquinone, 5 parts of pyridine and 11.5 parts of isophthaloylchloride. The temperature is raised to 45° C. and stirring is continued until the starting materials have been consumed. On the addition of 100 parts of nitrobenzene and 12.5 parts of 1-amino anthraquinone stirring is continued at 120–130° C. until the formation of the dyestuff is complete. On isolating the condensation product in the usual manner a strong greenish-yellow vat dyestuff is obtained in a nearly quantitative yield which may also be employed for printing purposes.

The same dyestuff is obtained when working in the first stage of the reaction with 1-aminoanthraquinone and then subjecting the intermediate product thus obtained to the action of 1-amino-5-benzoylaminoanthraquinone, or by replacing the pyridine by the corresponding amount of collidine, quinoline or dimethylaniline or by carrying out the reaction instead of in nitrobenzene in di- or trichlorobenzene.

A dyestuff of blackish-green shade is obtained when subjecting the reaction product obtained according to paragraph 1 to the action of aminodibenzanthrone.

Example 4

Into 400 parts of nitrobenzene there are added 38.4 parts of finely powdered 1-amino-5-benzoylaminoanthraquinone, 10 parts of pyridine and 23 parts of terephthaloylchloride; the whole is then stirred at 45° C. until the starting materials have been consumed. Then 25 parts of 1-aminoanthraquinone and 150 parts of nitrobenzene are added and the whole is heated for about 1 hour to 160° C. until the formation of the dyestuff is complete. On isolating the dyestuff represents a yellow crystalline powder which may easily be vatted and shows similar good dyeing properties as the product obtained according to Example 3.

Example 5

A mixture of 5.5 parts of 1-aminoanthraquinone, 5 parts of isophthaloylchloride, 75 parts of nitrobenzene and 6 parts of pyridine are heated to 50° C. while stirring until the formation of the intermediate reaction product is complete. On the addition of further 50 parts of nitrobenzene and 6.1 parts of 4-amino-1,9-anthrapyrimidine stirring is continued at 140° C. until the formation of dyestuff is complete. The dyestuff is isolated by sucking off and rinsed by means of pyridine. A strong, greenish-yellow dyestuff of good fastness properties is thus obtained.

A similar dyestuff is obtained in a good yield and of good fastness properties when replacing in this example the isophthaloylchloride by the chloride of the terephthalic acid; moreover, one of the two components may be replaced by the corresponding amount of 5-amino-1,9-anthrapyrimidine without materially altering the properties and shades of the dyestuff.

Example 6

A mixture of 100 parts of nitrobenzene, 9.6 parts of finely distributed 1-amino-5-benzoylaminoanthraquinone, 9 parts of dimethylaniline and 5.8 parts of isophthalic acid chloride is stirred at 45° C. until the reaction is finished. After the addition of 7.4 parts of 1-amino-4-methoxyanthraquinone and 100 parts of nitrobenzene stirring is continued at 140° C. until the formation of the dyestuff is complete. On cooling and isolating the reaction product in the usual manner a clear golden-yellow vat dyestuff is obtained.

Example 7

A suspension of the reaction product from 9.6 parts of 1-amino-5-benzoylaminoanthraquinone with 1 mol. of isophthaloylchloride obtained according to Example 3 is added to a solution of 6.35 parts of monoaminopyrene and 80 parts of nitrobenzene and stirred at 150° C. until the condensation is complete. On cooling the well crystallized reaction product is sucked off, rinsed and dried. It dyes cotton from a bordo-red vat even yellow shades.

Example 8

5 parts of the intermediate product obtained according to Example 2 are heated to 170–180° C. together with 1.5 parts of beta-naphthylamine and 30 parts of nitrobenzene and kept at this temperature for about 1 hour. On cooling the dyestuff crystallizing out is sucked off and rinsed with nitrobenzene and alcohol. It represents a strong yellow vat dyestuff.

Example 9

8 parts of the intermediate product obtained according to Example 2 are dissolved in 50 parts of nitrobenzene and after the addition of 1.5 parts of piperidine gradually heated to 100–150° C., until the evolution of the hydrogen halide has ceased. On cooling and isolating in the usual manner a greenish-yellow vat dyestuff is obtained in a good yield.

Example 10

A suspension of the intermediate product as is obtained according to Example 3 from 19.2 parts of 1-amino-5-benzoylaminoanthraquinone is diluted with 150 parts of nitrobenzene; thereupon 1-amino-6-chloroanthraquinone is added at 145° C. until the reaction is complete; this takes about 14.1 parts. After stirring for some hours the reaction product is isolated by removing the nitrobenzene by steam distillation. A strong, yellow vat dyestuff is thus obtained of good fastness properties.

Example 11

A mixture of 8 parts of 1-benzoylamino-5-aminoanthraquinone, 5.9 parts of naphthalene-1,4-dicarboxylic acid chloride, 80 parts of nitrobenzene and 2 parts of pyridine are caused to react until the 1-benzoylamino-5-aminoanthraquinone cannot be traced any longer. After the addition of 80 parts of nitrobenzene, and 8 parts of 1-benzoylamino-4-aminoanthraquinone the reaction is complete, the dyestuff crystallizing out representing an orange vat dyestuff of good fastness properties.

Example 12

75 parts of nitrobenzene are stirred for 2 hours together with 10 parts of 1-benzoylamino-5-aminoanthraquinone, 2.5 parts of pyridine and 5.75 parts of isophthalic acid chloride. On the addition of 7 parts of 2,5-dichloroaniline and of further 50 parts of nitrobenzene the temperature is raised to 165° C. until the condensation is complete. On cooling and isolating a clear yellow vat dyestuff is obtained of good fastness properties.

Instead of dichloroaniline also secondary aromatic bases may be employed; for instance, a yellow dyestuff of similar properties is obtained when working with diphenylamine.

*Example 13*

Into the suspension in nitrobenzene of the intermediate product obtained as described in Example 12 from 10 parts of 1-benzoylamino-5-aminoanthraquinone with isophthaloylchloride there are added 10.5 parts of 1-amino-4-β-naphthylaminoanthraquinone in 70 parts of boiling nitrobenzene. Thereupon temperature is raised for 1½ hours to 170° C. and then the whole is heated to boiling. On cooling the dyestuff formed separates out and is isolated by sucking off. It dyes cotton from the vat strong olive-green shades.

*Example 14*

20 parts of thionylchloride are caused to react with 10.5 parts of diphenyl-p,p'-dicarboxylic acid in 100 parts of nitrobenzene at 70° C. On removing the excess thionylchloride from the solution by distilling under reduced pressure the reaction mixture is allowed to cool to 45° C. Then 9.25 parts of 1-aminoanthraquinone and 3.7 parts of pyridine are added to the reaction mixture which is then stirred until the intermediate product has been formed. On the addition of 10 parts of 4-amino-1,9-anthrapyrimidine and 4 parts of pyridine in 50 parts of nitrobenzene the temperature is raised to 170° C., until the formation of the dyestuff has occurred, which takes about 1 hour. On isolating the product by sucking off, rinsing with nitrobenzene and alcohol and drying a light-yellow powder is obtained which dyes cotton from the vat even greenish-yellow shades.

*Example 15*

Into a suspension of 10 parts of finely powdered 1-benzoylamino-5-aminoanthraquinone in nitrobenzene there are added 7.75 parts of 2,5-dichloroterephthalic acid dichloride and 2.6 parts of pyridine. The whole is then stirred for some hours at 45° C. until the starting materials are not to be traced any longer. Into the suspension of the intermediate product thus obtained there is added a hot solution of 6.27 parts of 1-aminoanthraquinone in 60 parts of nitrobenzene. Thereupon the reaction mixture is stirred for 2 hours at 140° C. until the reaction is finished. On cooling and isolating by sucking off a greenish-yellow vat dyestuff of good fastness properties is obtained, which can be rinsed by boiling with a solvent such as pyridine or by treating its aqueous alkaline suspension with chlorine lye.

A similar dyestuff of a somewhat more reddish shade is obtained when replacing in the example described above the dichloride of the dichlorophthalic acid by the equivalent amount of the dichloride of the monochloroterephthalic acid.

*Example 16*

A suspension consisting of 10 parts of 1-benzoylamino-5-aminoanthraquinone in 100 parts of nitrobenzene is stirred for about 2 hours at 45–50° C. with 2.5 parts of pyridine and 5.8 parts of isophthalic acid chloride. Then 8 parts of dodecylamine are caused to react with the intermediate product thus obtained at 150° C. The isolated product which is obtained in a good yield dyes cotton from the vat even yellow clear shades.

Similar dyestuffs are obtained by replacing the dodecylamine by a secondary base such as dibutylamine.

*Example 17*

19.2 parts of 1-amino-5-benzoylaminoanthraquinone are caused to react in the presence of nitrobenzene with 11.5 parts of isophthaloylchloride as described in Example 3. On the addition of 100 parts of nitrobenzene and 13.3 parts of 1-methylaminoanthraquinone the whole is stirred until the formation of the dyestuff is complete. It is isolated in the usual manner and shows a somewhat more greenish shade than the product obtained according to paragraph 1 of Example 3.

*Example 18*

9.6 parts of 1-amino-5-benzoylaminoanthraquinone are caused to react with 5.7 parts of isophthalic acid chloride as described in Example 6. Thereupon another 100 parts of nitrobenzene are added together with 9.6 parts of 1-amino-4-benzoylaminoanthraquinone, the whole being stirred at 140° C. until the formation of the dyestuff is complete. It is identical with that obtained according to paragraph 3 of Example 2.

A similar dyestuff is obtained by replacing the isophaltic acid chloride by terephthalic acid chloride.

We claim:—

1. The products of the formula:

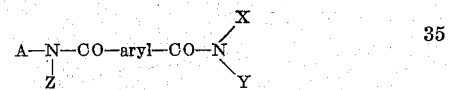

wherein A stands for a radical which is capable of being vatted, X stands for a member of the group consisting of alkyl, aryl and a radical which is capable of being vatted and is different from that designated by A, Y stands for a member of the group consisting of hydrogen and alkyl, and Z stands for a member of the group consisting of hydrogen and alkyl.

2. The products of the formula:

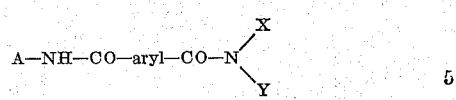

wherein A stands for a radical which is capable of being vatted, X stands for a radical which is capable of being vatted and is different from that designated by A and Y stands for a member of the group consisting of hydrogen and alkyl.

3. The products of the formula:

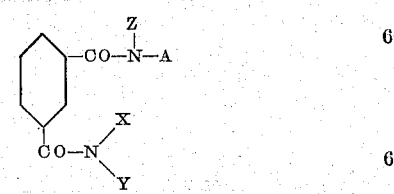

wherein A stands for a radical which is capable of being vatted, X stands for a member of the group consisting of alkyl, aryl and a radical which is capable of being vatted and is different from that designated by A, Y stands for a member of the group consisting of hydrogen and alkyl, and Z stands for a member of the group consisting of hydrogen and alkyl.

4. The products of the formula:

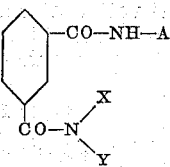

wherein A stands for a radical which is capable of being vatted, X stands for a radical which is capable of being vatted and is different from that designated by A, and Y stands for a member of the group consisting of hydrogen and alkyl.

5. The products of the formula:

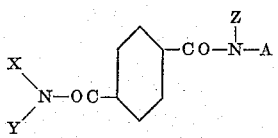

wherein A stands for a radical which is capable of being vatted, X stands for a member of the group consisting of alkyl, aryl and a radical which is capable of being vatted and is different from that designated by A, Y stands for a member of the group consisting of hydrogen and alkyl, and Z stands for a member of the group consisting of hydrogen and alkyl.

6. The products of the formula:

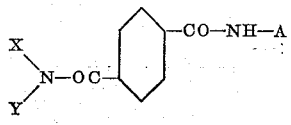

wherein A stands for a radical which is capable of being vatted, X stands for a radical which is capable of being vatted and is different from that designated by A, and Y stands for a member of the group consisting of hydrogen and alkyl.

7. The products as claimed in claim 1 wherein the compounds which are capable of being vatted are of the anthraquinone series.

8. The products as claimed in claim 2 wherein the compounds which are capable of being vatted are of the anthraquinone series.

9. The products as claimed in claim 3 wherein the compounds which are capable of being vatted are of the anthraquinone series.

10. The products as claimed in claim 4 wherein the compounds which are capable of being vatted are of the anthraquinone series.

11. The products as claimed in claim 5 wherein the compounds which are capable of being vatted are of the anthraquinone series.

12. The products as claimed in claim 6 wherein the compounds which are capable of being vatted are of the anthraquinone series.

13. The products of the formula:

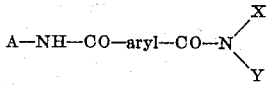

wherein A stands for an anthraquinone radical the NH group being attached thereto in 1-position, X stands for a member of the group consisting of alkyl, aryl and a radical which is capable of being vatted and is different from that designated by A, Y stands for a member of the group consisting of hydrogen and alkyl.

14. The products of the formula:

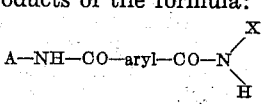

wherein A stands for an athraquinone radical the NH group being attached thereto in 1-position, and X stands for an anthraquinone radical which is different from that designated by A, the NH group being attached thereto in 1-position.

15. The products of the formula:

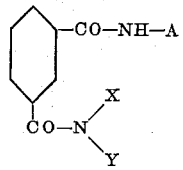

wherein A stands for an anthraquinone radical the NH group being attached thereto in 1-position, X stands for a member of the group consisting of alkyl, aryl and a radical which is capable of being vatted and is different from that designated by A, Y stands for a member of the group consisting of hydrogen and alkyl.

16. The products of the formula:

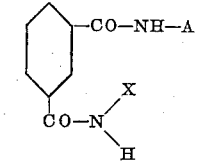

wherein A stands for an anthraquinone radical the NH group being attached thereto in 1-position, and X stands for an anthraquinone radical which is different from that designated by A, the NH group being attached thereto in 1-position.

17. The products of the formula:

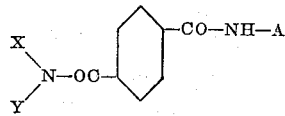

wherein A stands for an anthraquinone radical the NH group being attached thereto in 1-position, X stands for a member of the group consisting of alkyl, aryl and a radical which is capable of being vatted and is different from that designated by A, Y stands for a member of the group consisting of hydrogen and alkyl.

18. The products of the formula:

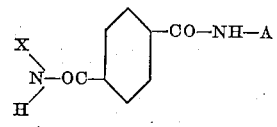

wherein A stands for an anthraquinone radical the NH group being attached thereto in 1-position, and X stands for an anthraquinone radical which is different from that designated by A, the NH group being attached thereto in 1-position.

19. The products of the formula:

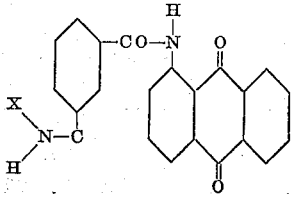

wherein X stands for an anthraquinone radical being attached to the NH group in 1-position and containing a benzoylamido group.
20. The products of the formula:
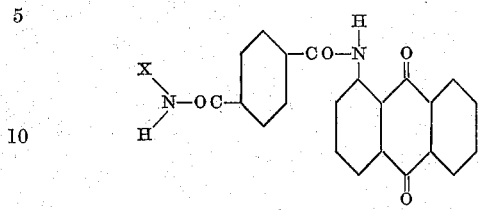
wherein X stands for an anthraquinone radical being attached to the NH group in 1-position and containing a benzoylamido group.
21. The product of the formula:
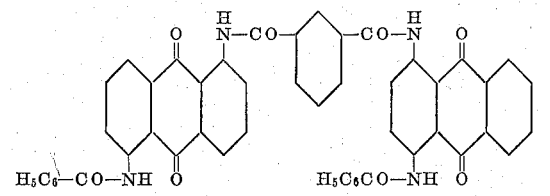
WALTER MIEG.
FRANZ WIENERS.